United States Patent [19]
Kikuchi et al.

[11] Patent Number: 6,104,688
[45] Date of Patent: Aug. 15, 2000

[54] OBJECTIVE LENS, REPRODUCING APPARATUS AND REPRODUCING METHOD

[75] Inventors: Nobuyasu Kikuchi, Chiba; Akio Yamakawa, Tokyo, both of Japan

[73] Assignee: Sony Corporation, Tokyo, Japan

[21] Appl. No.: 09/019,600

[22] Filed: Feb. 6, 1998

[30] Foreign Application Priority Data

Feb. 17, 1997 [JP] Japan ................................. 9-032256

[51] Int. Cl.$^7$ ........................................... G11B 7/00
[52] U.S. Cl. ...................... 369/112; 369/94; 369/44.23
[58] Field of Search ..................... 369/58, 47, 48, 369/54, 94, 44.12, 44.23, 44.27, 44.37, 112

[56] References Cited

U.S. PATENT DOCUMENTS

| | | | |
|---|---|---|---|
| 5,867,468 | 2/1999 | Mori et al. | 369/44.23 X |
| 5,933,401 | 8/1999 | Lee et al. | 369/44.37 X |

FOREIGN PATENT DOCUMENTS

| | | |
|---|---|---|
| 0 731 458 A1 | 9/1996 | European Pat. Off. . |
| 0 780 838 A1 | 6/1997 | European Pat. Off. . |

*Primary Examiner*—Muhammad Edun
*Attorney, Agent, or Firm*—Ronald P. Kananen; Rader, Fishman & Grauer

[57] ABSTRACT

An objective lens, a reproducing apparatus and a reproducing method using a single objective lens for a DVD which can also read a CD without adding any peripheral member can be obtained. In an objective lens which is arranged so that a light beam emitted form a common light source (11) may be focused through a common objective lens (8) on respective signal recorded surfaces (1a), (2a) of a DVD (2) and a CD (1) having light transmitting layers (1c), (2c) of different thicknesses, an area of the objective lens (8) for the DVD (2) in a range of a numerical aperture NA from 0 to 0.3–0.4 from the light axis is worked to form correcting lens surface 8a for correcting the aberration caused when reading the CD (1) through the objective lens for the DVD (2), thereby allowing the CD to be read through the objective lens for the DVD.

10 Claims, 17 Drawing Sheets

OBJECTIVE LENS, REPRODUCING APPARATUS AND REPRODUCING METHOD

BACKGROUND

1. Field of the Invention

The present invention relates to an objective lens, a reproducing apparatus and a reproducing method using this objective lens which is arranged so that a light beam emitted from a common light source may be focused through a single lens on respective signal recorded surfaces of at least two optical disks having light transmitting layers of different thickness for selectively reproducing the optical disk.

2. Background of the Invention

In the past, the compact disk (hereinafter referred to as a CD) has been widely spread as the optical disk which is a recording medium for reproducing recorded information using the light beam. Recently, however, new recording media for digitally reproducing a long video record or the like such as the digital video (Versatile) disk (hereinafter referred to as a DVD) has been developed.

When digital information is to be read out of the recording medium using the light beam as described above, a laser light beam is irradiated at pits on tracks of the recording medium and its reflected light is detected. A level of the reflected light is calculated and converted to binary data by a reproductive processing unit and the like, thereby enabling recorded information to be reproduced.

FIG. 1 shows an example of a structure of an optical head unit for a CD. A laser diode 21 forming a light source emits a laser light whose wave length is 780 nm. A grating 22 is arranged to divide one laser light emitted from the laser diode 21 into a plurality of (substantially three) laser lights, one of these three laser lights being used for readout of data a focusing servomechanism, and two remaining laser lights being used for a tracking servomechanism.

A beam splitter 23 which is a spectroscopic means made of transparent parallel plates reflects toward an objective lens 24 the laser light which is emitted from the laser diode 21 and is incident thereon through the grating 22. The beam splitter further gives an astigmatism to a reflected (i.e., or converged) light by a CD 100 which has returned through the objective lens 24 and makes that light to penetrate therethrough to a photodiode 25.

The objective lens 24 converges the laser light and makes it irradiate on an information recorded layer 102 of the CD 100 where fine pits are arranged. The objective lens 24 further converges the reflected light from the information recorded layer 102 of the CD 100 and makes it incident on the photodiode 25 through the beam splitter 23.

In addition, concerning the objective lens 24, as its numerical aperture (NA) becomes greater, the converging angle of light becomes larger, thereby allowing the light to be converged on a smaller area. In this example, an objective lens having the NA of 0.45 is utilized as the objective lens 24.

The photodiode 25 is arranged to detect the returned light of the laser light which is made to irradiate on the CD 100 by the laser diode 21. Since the laser light is divided into three lights by the grating 22, the photodiode 25 has also three light receiving parts corresponding thereto. One of these parts of the photodiode 25 is a light-receiving one for receiving the laser light which has read data. Two remaining two parts thereof are utilized to receive the two laser lights for tracking and to control the tracking of the objective lens 24 on the basis of an amount of the received lights so that the laser light for reading data may be irradiated on a predetermined track.

The laser light reflected by the information recorded layer 102 and then being incident on the photodiode 25 involves an astigmatism because it passes the beam splitter 23 as a converging light. The focusing servo operation will be effected by using this astigmatism.

The CD 100 as a recording medium comprises the information recorded layer 102 formed on a substrate 101 which is a light transmitting layer having a thickness t of 1.2 mm and a protecting film 103 formed on the information recorded layer 102. The laser light emitted from the laser diode 21 penetrates the transparent substrate 101 and then irradiates the information recorded layer 102. The information recorded layer 102 has pits corresponding to the recorded information. When the laser light irradiates the pits, the diffraction is caused so that an intensity of the returned light (i.e., the light reflected on the recording medium and then being incident on the photodiode 25) will be weakened. When the laser light irradiates a portion with no pit, it is intactly reflected so that the intensity of the returned light will be strengthened. The photodiode 25 detects such returned lights and converts the intensity of the returned lights to binary digits "1", "0". Thus, the data recorded on the CD 100 as the pits are read out.

In the way described above, the recorded information is read out by making the laser light irradiate the pits of the CD while performing the tracking servo and the focusing servo, and then detecting its returned light.

Recently, on the other hand, a DVD 200 with such a structure as is shown in FIG. 2 has been proposed. While the CD 100 has an information recorded on its only one side surfaces, DVD 200 has information recorded on its both side surfaces. Particularly, the DVD 200 is made of two parts in one part of which an information recorded layer 202 is formed on a substrate 201 and a protecting film 203 is formed on the information recorded layer 202, and in the other portion of which an information recorded layer 302 is formed on a substrate 301 and a protecting film 303 is formed on the information recorded layer 302. The two parts are secured by joining both the protecting films 203 and 303.

In the DVD 200, since information is recorded in high density, the substrates 201 and 301 are made smaller as compared with that of the CD 100 in thickness in order to alleviate an influence due to a skew, an error of the substrate's thickness, and so forth. In other words, the substrate 101 of the CD 100 is made to be 1.2 mm thick, whereas the substrates 201 and 301 of the DVD 200 are made to be 0.6 mm thick, respectively. Also, a pit length and an interval between pits in the DVD 200 are made smaller than those of the CD 100.

Because the recording density of such DVD 200 is thus higher than the recording density of the CD 100, a laser diode which generates a laser light having a shorter wave length (635 to 650 nm) than that of the laser diode 21 for the CD is employed as the laser diode 41 of the optical head unit for the DVD. Moreover, a grating 42, a beam splitter 43, an objective lens 44 and a photodiode 45 other than the laser diode have the same structure as that of the optical head unit for the CD.

However, because the DVD 200 has a minute pit as compared with that of the CD 100, an objective lens having a numerical aperture NA which is larger (NA=0.6) than that (NA=0.45) of the objective lens 24 for the CD 100 is used as the objective lens 44 for the DVD 200. By using such objective lens 44 whose numerical aperture is large, it is possible to converge the laser light on a smaller area for reading the minute pits.

As described above, since the structure of the objective lens differs between the CD 100 and the DVD 200, it is normally required to employ different optical head units in order to read the information out of the recording medium. For example, when the optical head unit for the DVD is to be utilized for the CD, an influence by the spherical aberration due to a difference between thickness of the substrates 101 of the CD 100 and those of the substrates 201 and 301 of the DVD 200 and a difference between the numerical apertures will occur.

For example, when the reproduction is performed on a CD having the substrate whose thickness is 1.2 mm through the objective lens with the numerical aperture of 0.6 which is optimized for the DVD 200 having the substrate whose thickness is 0.6 mm, the spherical aberration occurred amounts even to 3.6 µm in the fourth order Seidel spherical aberration coefficient $W_{40}$. Expressing this by the root mean square (rms), it will be 0.268 rms·µs (if normalized by wave length λ (=650 nm), 0.412 rms ·λ). For such reason, it is generally required in the optical disk that the total sum of the root mean square of the aberrations of all optical systems is less than the Marechal criterion value 0.07 rms·λ. Therefore, it is difficult to read data from the CD 100 with the optical head unit for the DVD.

Thus, the applicant of the present invention has proposed, for example, in patent application Ser. No. 277400/1994 that the optical head unit for the DVD can be applied to the CD by adjusting the NA of the objective lens depending on a sort of the recording medium.

FIG. 3 and FIG. 4 illustrate the principle of what is described above. As is shown in FIGS. 3 and 4, this structure further includes a diaphragm 51, a driver unit 53 for driving this diaphragm 51 and a discriminating device 52 for discriminating the sort of the recording medium in addition to the structure of the optical head unit for the DVD as shown in FIG. 16.

When the discriminating device 52 discriminates the sort of the recording medium, and then the driver unit 53 works to read the data from the DVD 200 correspondingly to a result of the discrimination, it makes the diaphragm 51 widely open so that the NA of the objective lens 44 may be 0.6 as shown in FIG. 3. In constant to this, when reading the data from the CD 100, the driver 53 makes the diaphragm 51 less widely open so that the NA of the objective lens 44 may be 0.45 as shown in FIG. 4. In other words, when reading the data from the CD 100, it is possible to perform the readout operation by reducing the numerical aperture of the objective lens 44 for alleviating the influence of the spherical aberration ($W_{40}$ is proportional to the fourth power of the numerical aperture).

However, if such diaphragm 51 as described above is newly provided, the number of parts of the optical head unit will then increase to make it expensive and a scale of the whole apparatus will also become bulky. Furthermore, since the diaphragm 51 is mechanically operated, it tends to delicately be affected by vibration. Besides, it is hard to act promptly, which raises a problem that it tends to cause a trouble.

As an alternative means though not shown, an optical system has been proposed, in which the readout of a CD is also ensured by combining a hologram lens with the objective lens. In this case, however, there is a problem that adding the hologram lens makes the cost increase and in particular it will be very difficult to control the aberration of the optical system.

SUMMARY OF THE INVENTION

In view of such aspects, it is an object of the present invention to obtain an objective lens, a reproducing apparatus and a reproducing method using that objective lens which is capable of ensuring the readout of a DVD as well as a CD through a single lens without adding any peripheral member.

In order to accomplish the above object, the present invention provides an objective lens which is arranged so that a light beam emitted from a common light source may be focused through a common lens on respective recorded surfaces of at least two recording media having light transmitting layers of different thicknesses, wherein the objective lens is comprised of a single lens and is made to have a correcting lens surface for correcting an aberration caused when reading the recording media having light transmitting layers of different thicknesses.

The present invention also provides a reproducing apparatus comprising an optical head unit for making a light beam irradiate respective signal recorded surfaces of at least two recording media having light transmitting layers of different thicknesses from light incident surfaces to the signal recorded surfaces and then converting the reflected lights thereof to an electric signal, and a reproductive processing unit for reproducing information signals recorded on the signal recorded surfaces depending on the electric signal, wherein the optical head unit includes a light source for emitting a common light beam, a spectroscopic means for splitting the light beam by reflection and penetration, an objective lens in which a common lens for focusing the common light beam reflected by the optical splitter means on the respective signal recorded surfaces of at least two recording media having light transmitting layers of different thicknesses is formed of one lens and which has a correcting lens surface for correcting an aberration caused when reading the recording media having the light transmitting layers of different thicknesses, and a photo detector means for receiving the lights reflected from the respective signal recorded surfaces of at least two recording media and penetrating the optical splitter means to convert the same to an electric signal, in which the reproductive processing unit is arranged to process for reproducing the electric signal in dependence on the reflected light detected by the photo detector means from the respective signal recorded surfaces of the recording media.

Moreover, the present invention provides a reproducing method including the steps of converting a light beam to irradiate the respective signal recorded surfaces of at least two recording media having light transmitting layers of different thicknesses from the light incident surface to the signal recorded surfaces through a single common lens, converting its reflected light to an electric signal, and reproducing an information signal recorded on the signal recorded surfaces depending on the electric signal, wherein a lens which makes the light beam irradiate the respective signal recorded surfaces of the recording media is formed of a single lens, an objective lens is used which has a correcting lens surface for correcting an aberration caused when reading the recording media having the light transmitting layers of different thicknesses, the signal recorded surface of the recording medium having the light transmitting layer of a thin thickness being read with a light beam condensed through the whole surface of the objective lens, whereas the signal recorded surface of the recording medium having the light transmitting layer of a thicker thickness being read with a light beam condensed through the correcting lens surface.

DESCRIPTION OF THE PREFERRED EMBODIMENTS

An embodiment of the objective lens, the reproducing apparatus and the reproducing method according to the present invention will be described below by taking an example which enables a CD to be read using an optical head unit for a DVD 1 with reference to the accompanying drawings.

Figure 5:
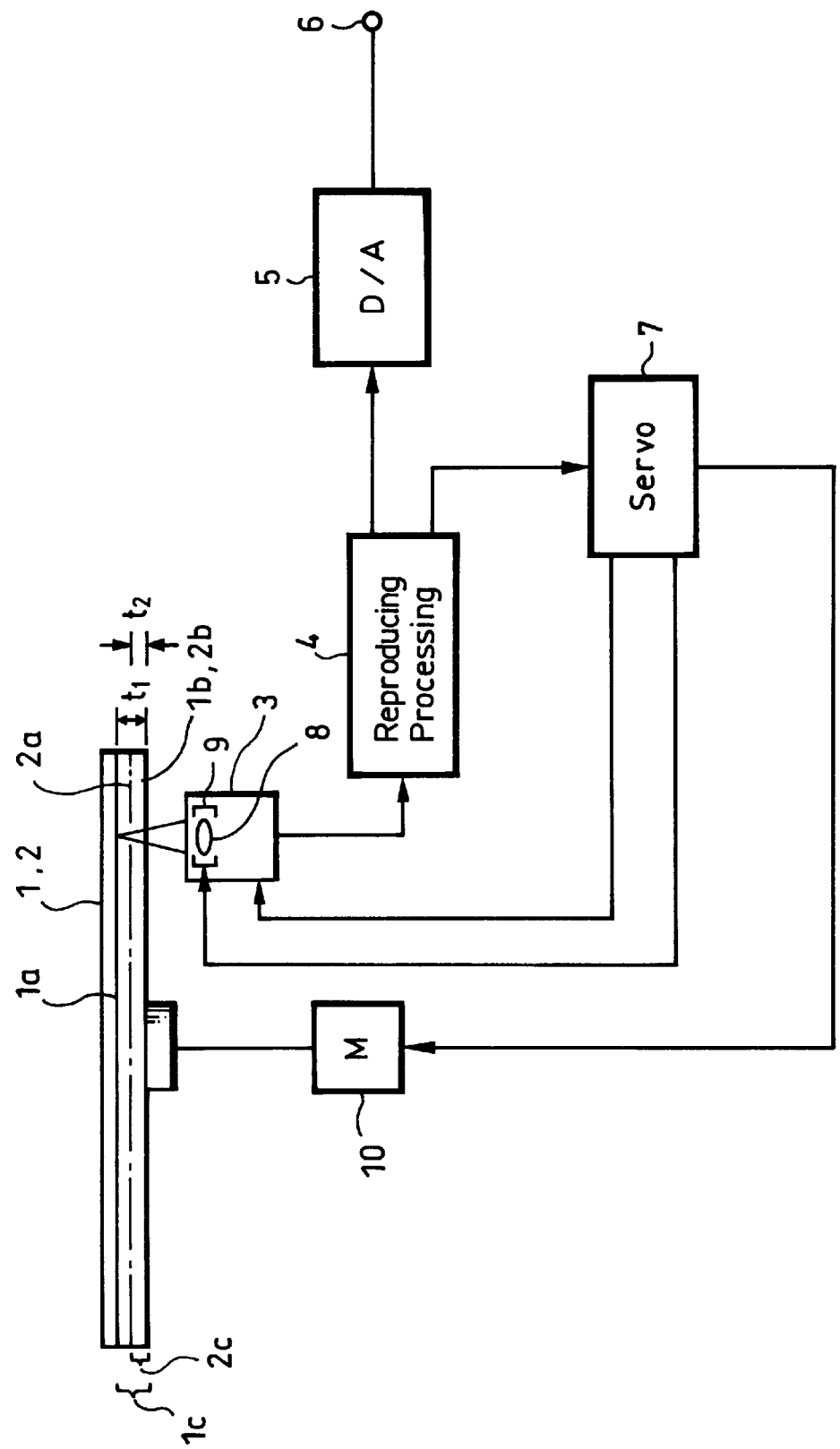
FIG. 5 is a structural block diagram of an optical disk reproducing apparatus using an objective lens according to the present invention.
Figure 6:
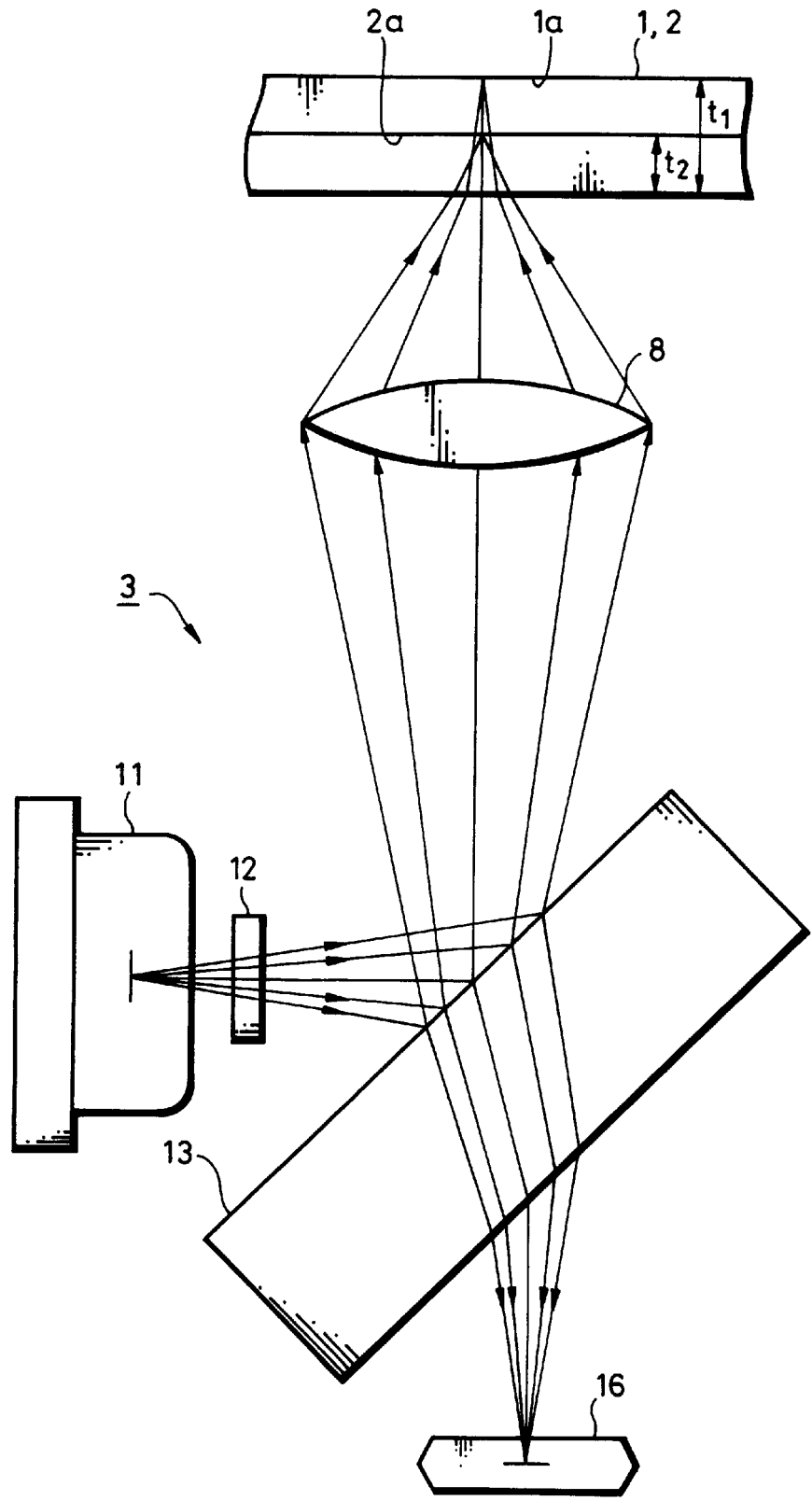
FIG. 6 is a structural diagram of the optical head unit.

FIG. 5 shows an example of the configuration of the optical disk reproducing apparatus in which an optical disk comprises two optical disks having respective light transmitting layers of different thicknesses, namely, a CD 1 and a DVD 2 having their signal recorded surfaces 1a and 2a, respectively.

The thickness of a light transmitting layer 1c of the CD 1 from a light incident surface 1b to the signal recorded surface 1a is $t_1$ which is greater than a thickness $t_2$ of a light transmitting layer 2c of the DVD 2 from its light incident surface 2b to the signal recorded surface 2a. In this case, the thickness $t_1$ is 1.2 mm and the thickness $t_2$ is 0.6 mm, for example.

Specifically, the optical disk reproducing apparatus comprises an optical head unit 3 for making a light beam, e.g. of 650 nm wave length irradiate the signal recorded surface 1a or 2a through the light transmitting layer 1c or 2c having a different thickness $t_1$ or $t_2$ and converting the reflected light from the CD 1 or the DVD 2 to an electric signal, and a reproductive processing unit 4 for reproducing the information signal recorded on the signal recorded surface 1a or 2a depending on the electric signal derived by the optical head unit 3.

The reproductive processing unit 4 performs a calculation processing on the electric signal detected by the optical head unit 3 and generates reproduced signals such as an RF signal, a tracking error signal, a focusing error signal and so on. Regarding the RF signal, EFM demodulation, CIRC decoding, and so forth are carried out on the RF signal to obtain reproduced digital data. In addition, for an optical disk having such a diameter of 64 mm, audio compression decoding or the like will further be performed to obtain the reproduced digital data. The reproduced digital data output from the reproductive processing unit 4 is converted to analogue audio data of L and R channels by a digital to analogue (D/A) converter 5 which are then output from an output terminal 6.

The tracking error signal and the focusing error signal are supplied to a servo circuit 7. The servo circuit 7 carries out according to these signals a tracking error control, a focusing error control and a sled control. Specifically, by supplying a focus driving signal to a two-axis mechanism 9 holding an objective lens 8 in the optical head unit 3, the objective lens 8 is driven to move in a direction approaching or leaving the optical disk 1 or 2 for performing the focusing control. Furthermore, a sled driving signal is generated by extracting a low frequency band component of the tracking error signal for driving a sled mechanism, thereby causing the entire optical head unit 3 to be moved in a radius direction of the optical disk 1 or 6.

Moreover, the reproductive processing unit 4 generates a spindle error signal from a clock derived by supplying the reproduced data into a PLL circuit. This spindle error signal is supplied to the servo circuit 7 which controls a rotation of a spindle motor 10 to be kept at a constant speed (CLV).

Figure 1:
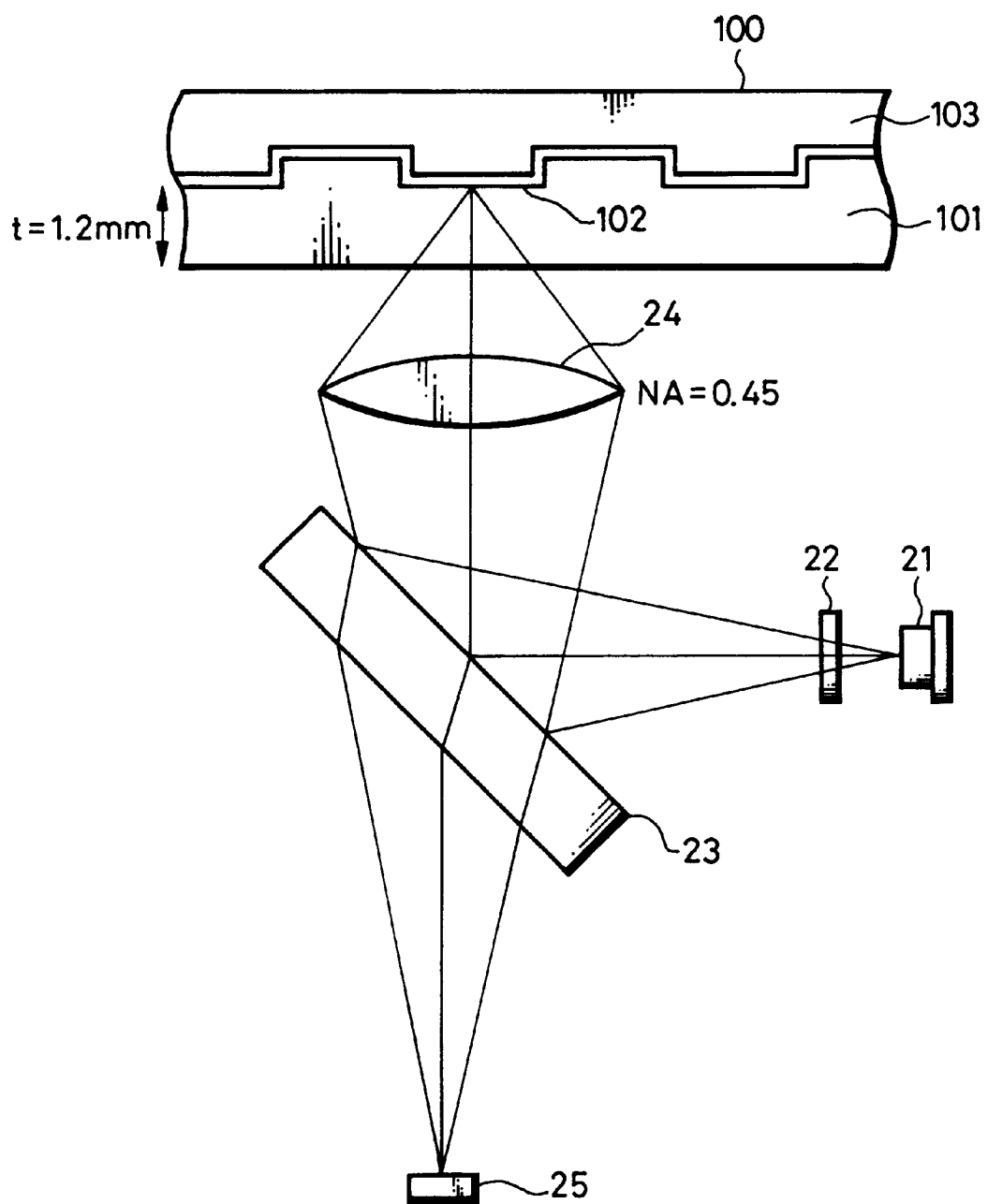
FIG. 1 is a diagram showing the structure for reading a CD by means of the conventional optical head unit for the CD.
Figure 2:
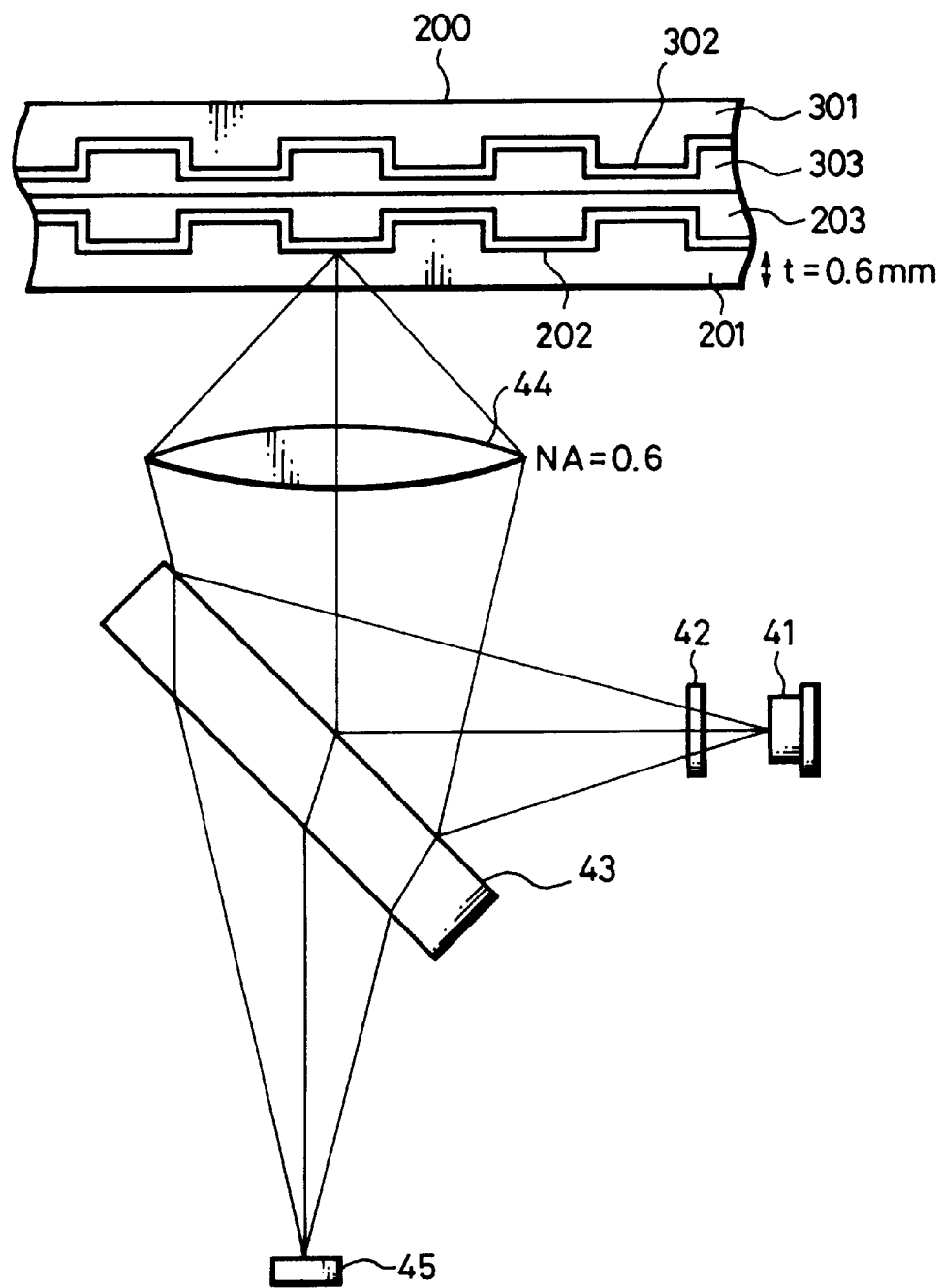
FIG. 2 is a diagram showing the structure for reading a DVD by means of the conventional optical head unit for the DVD.
Figure 3:
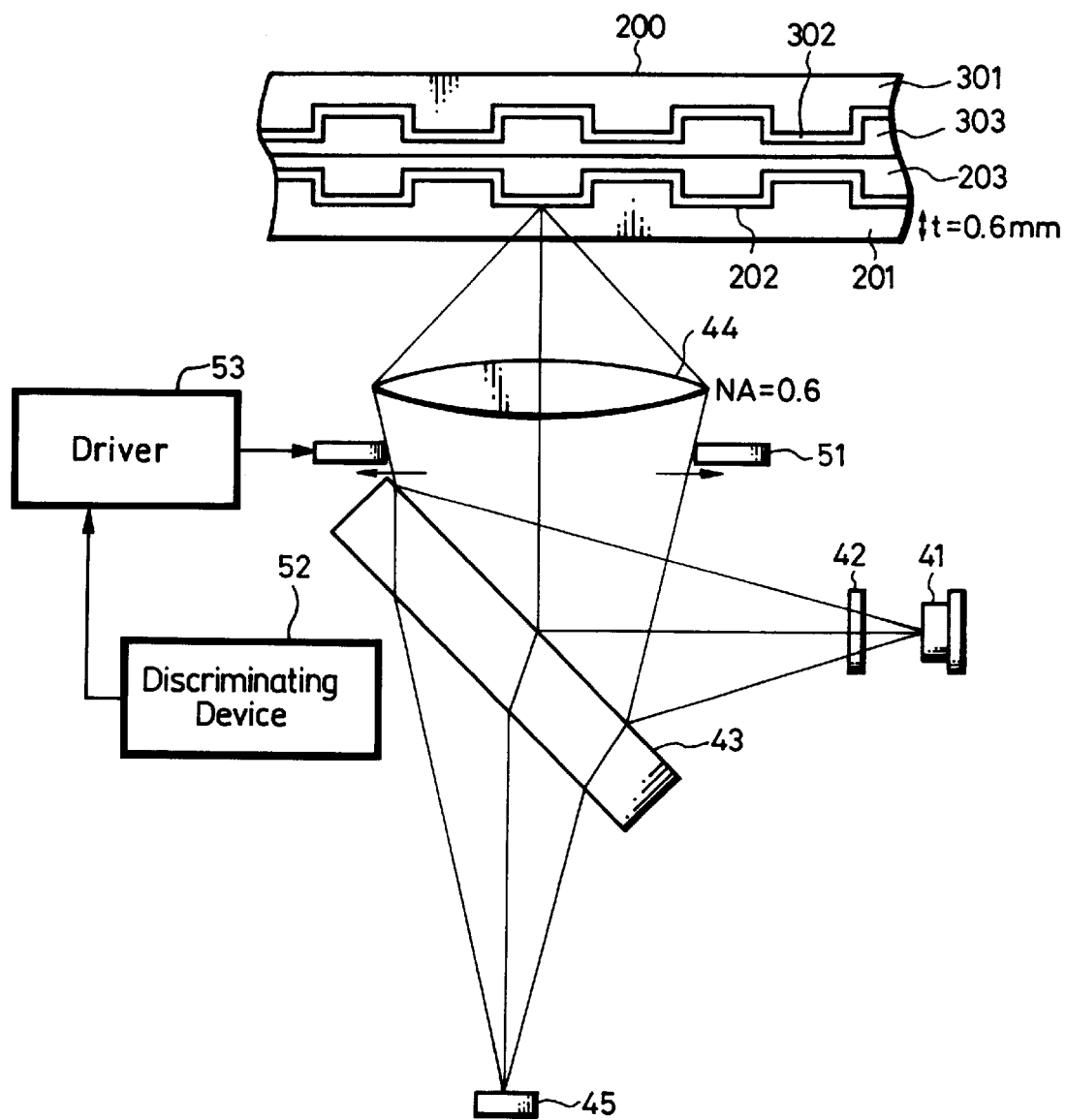
FIG. 3 is a diagram showing the structure for reading the DVD by means of the conventional optical head unit common to both the DVD and the CD.
Figure 4:
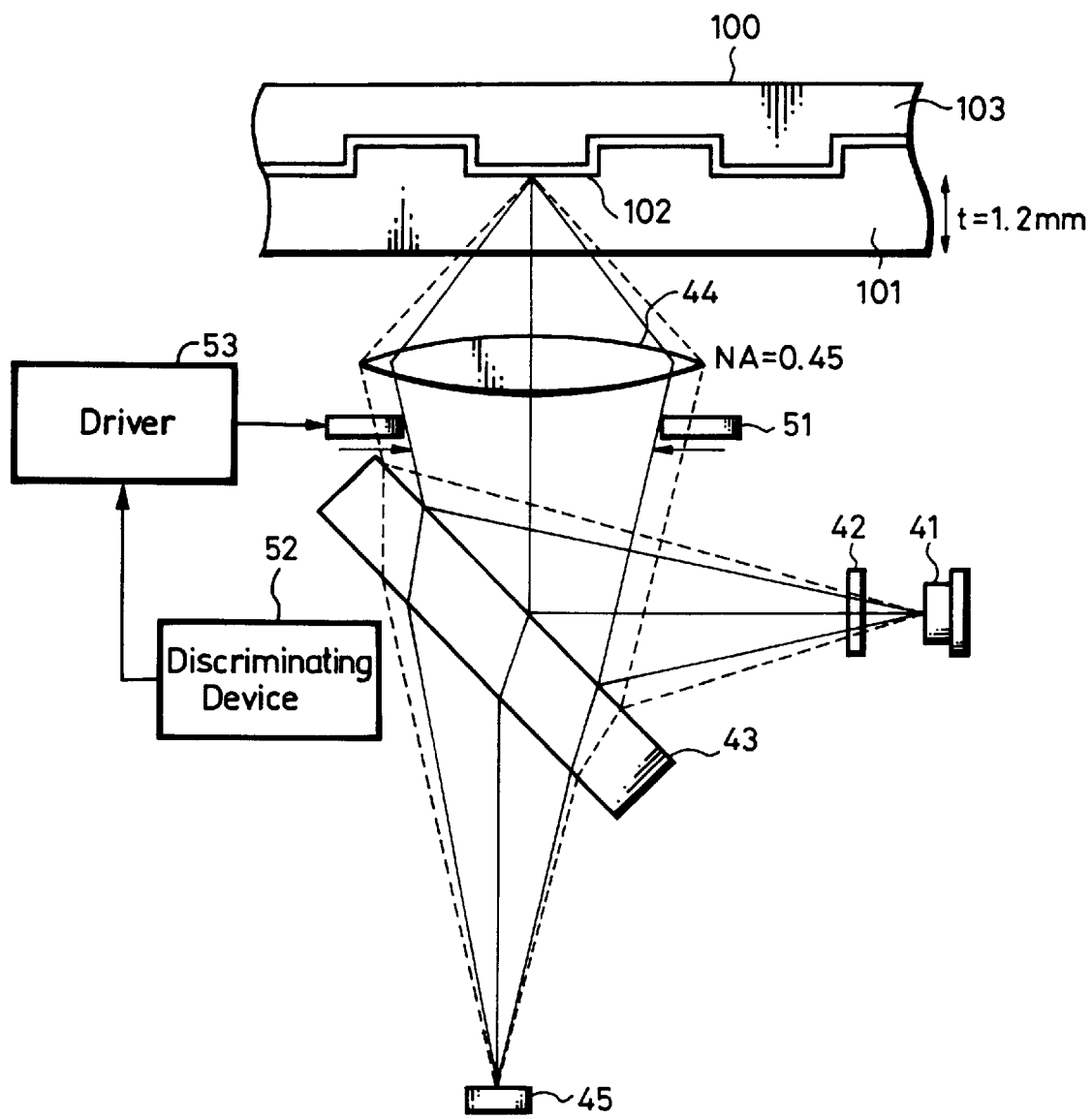
FIG. 4 is a diagram showing the operation of reading the CD by means of the same head unit as in FIG. 3.

In this case, as shown in FIG. 2, the optical head unit 3 comprises a light source 11 such as a laser diode for emitting a common light beam (wave length=650 nm) onto the signal recorded surface 1a or 2a of the CD 1 or DVD 2, a beam splitter 13 for receiving the light beam emitted from the light source 11 through a grating 12 and splitting the light beam by making it penetrate and reflect, the objective lens 8 for focusing the light beam reflected by the beam splitter 13 on the recorded surface 1a or 2a of the CD 1 or DVD 2, and a photo detector 16 such as a photodiode for receiving the reflected light from the signal recorded surface 1a or 2a through the beam splitter 13 and converting it to an electric signal.

Now, the objective lens 8 which is capable of focusing the light beam on the signal recorded surface 1a or 2a of the CD 1 or DVD 2 will be described below in detail.

First of all, a process for obtaining the optimum objective lens which enables the light beam to be focused on the signal recorded surface 1a or 2a of the CD 1 or DVD 2 will be described.

Figure 7:
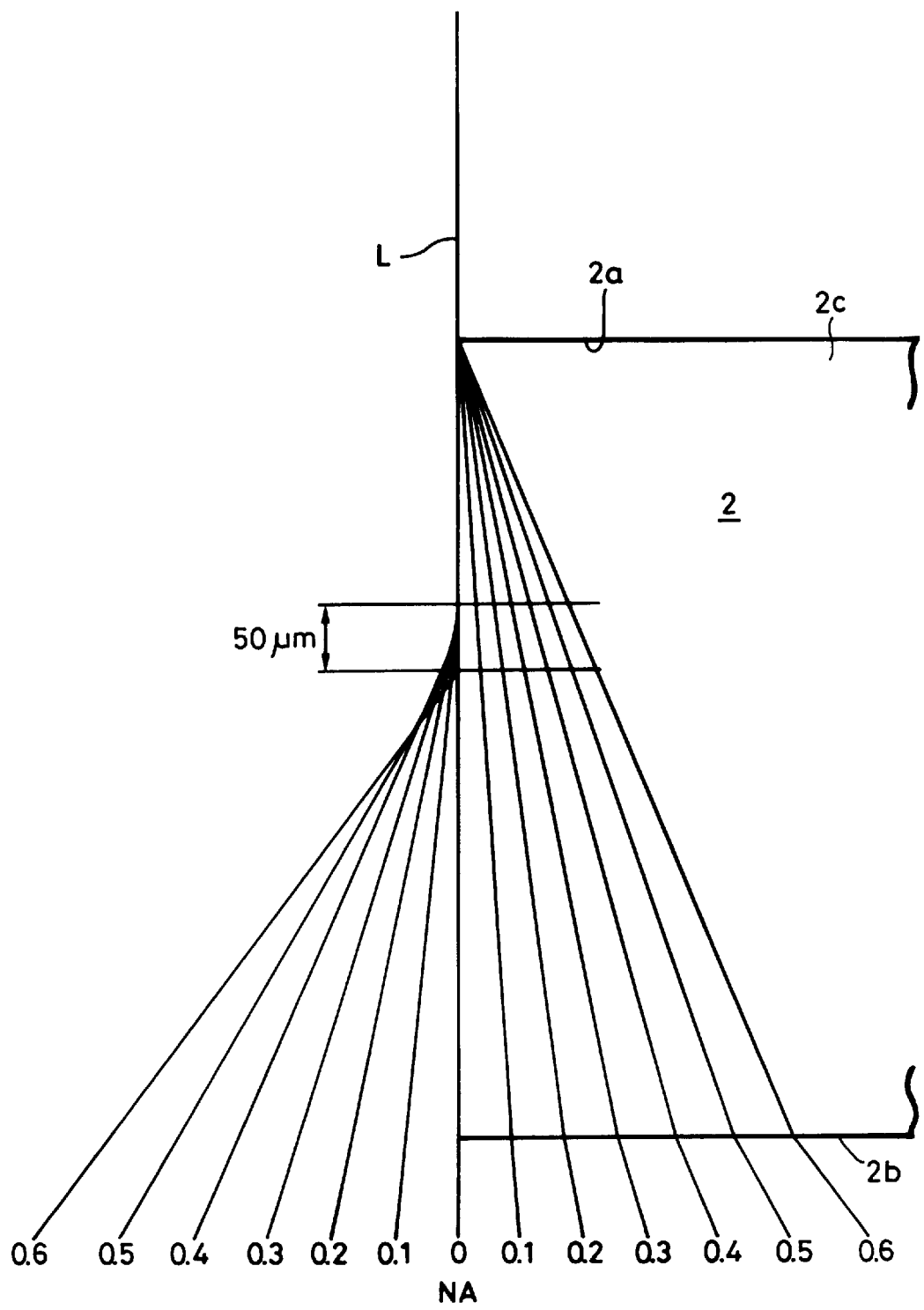
FIG. 7 is a condensed light diagram showing respective tracks of a light beam when the light beam is condensed on the DVD and without a disk through the objective lens having the numerical aperture NA=0.6.

FIG. 7 is a graph which shows traces of the light beam under a condition that the light beam of 650 nm wave length is emitted to the DVD 2 having the light transmitting layer 2c of 0.6 mm thickness from the light incident surface 2b to the signal recorded surface 2a through an objective lens having the numerical aperture NA of 0.6(NA is divided at an interval of 0.1 each) and traces of the light beam under a similar condition except that the DVD 2 is not present for each half side of the respective traces with respect to an optical axis L being shown.

It can be seen from these traces that the light beam penetrating the DVD 2 focuses on the optical axis L on the signal recorded surface 2a, thereby enabling the signal recorded surface 2a of the DVD 2 to be read, whereas in a condition that the DVD 2 is not present the light beam is short-focused over the range of 50 μm due to the spherical aberration (proportional to the square of the numerical aperture NA). The state of the spherical aberration at this time is shown in FIG. 8.

Figure 9:
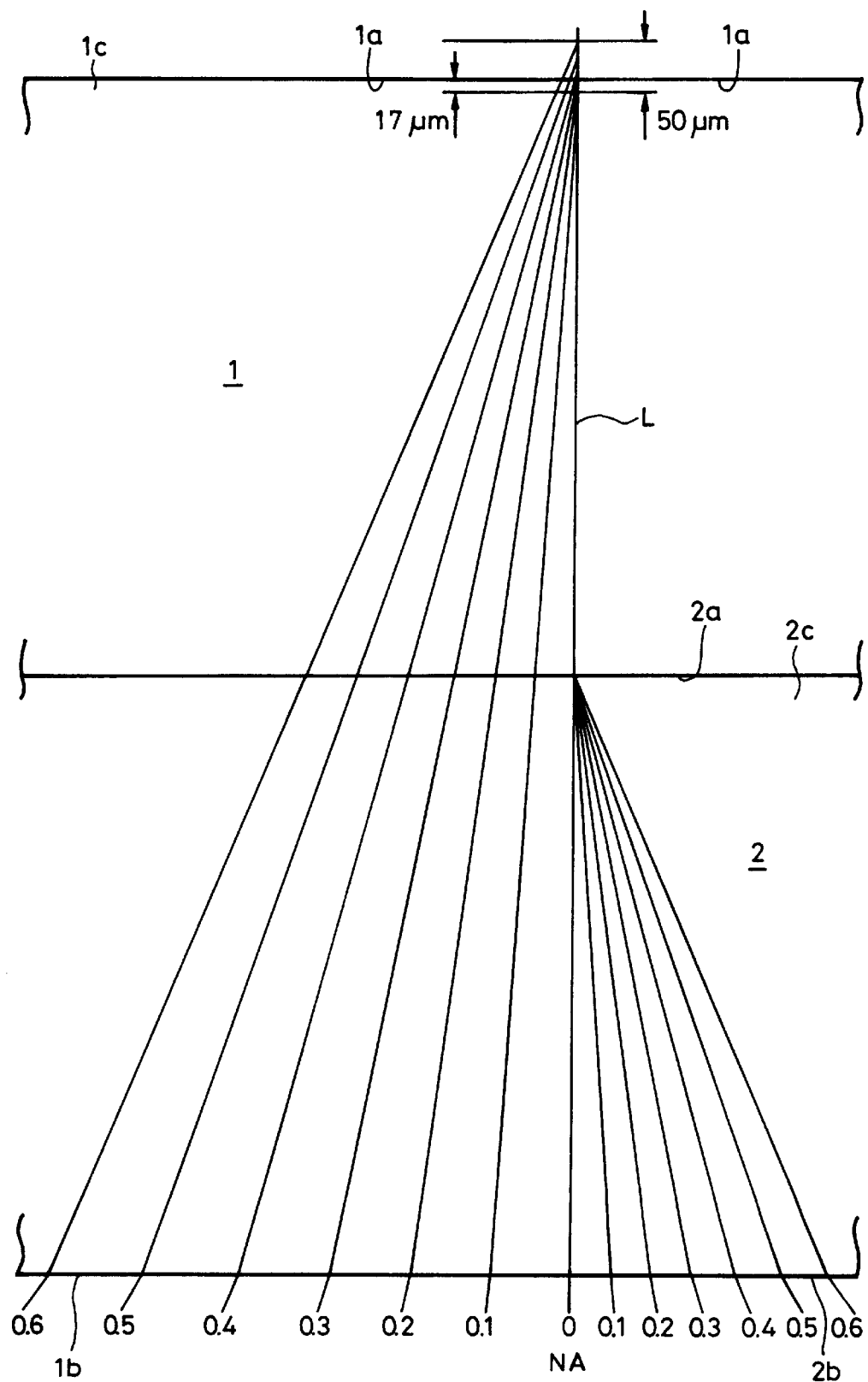
FIG. 9 is a condensed light diagram showing traces of the light beam when the light beam is condensed on the DVD and the CD through the objective lens having the numerical aperture NA=0.6.

On the other hand, FIG. 9 is a graph which shows under the condition similar to obtain the traces of the light beam when the light beam of 650 nm wave length is emitted to the DVD 2 having the light transmitting layer 2c of 0.6 mm thickness from the light incident surface 2b to the signal recorded surface 2a through the objective lens having the numerical aperture NA of 0.6 (NA is divided at an interval of 0.1 each), traces of the light beam under a condition that the light beam of 650 nm wave length is emitted to the CD 1 having the light transmitting layer 1c of 1.2 mm thickness from the light incident surface 1b to the signal recorded surface 1a through the objective lens having the numerical aperture NA of 0.6, each half side of the respective traces with respect to the optical axis L being shown.

Figure 8:
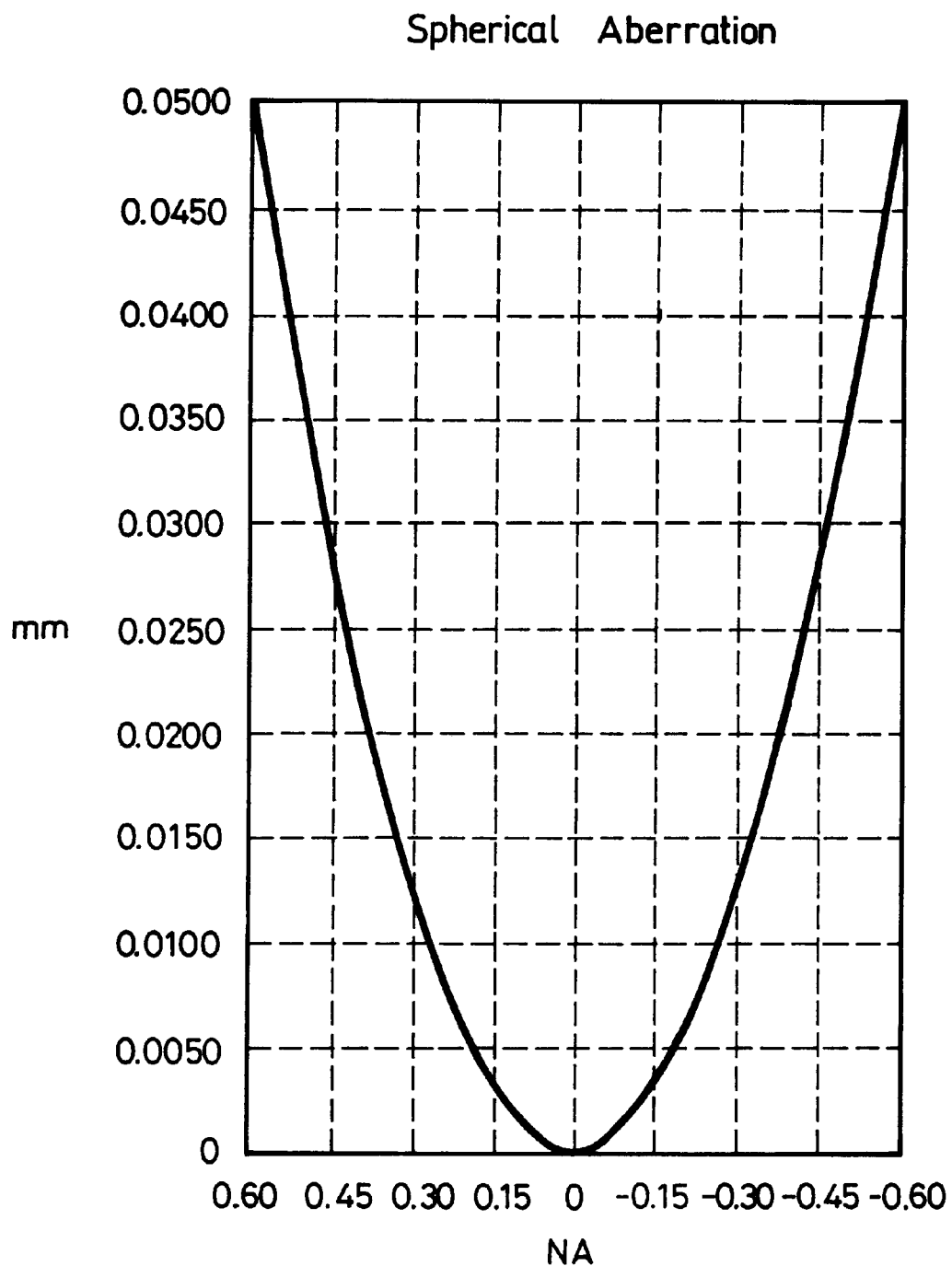
FIG. 8 is a diagram showing the spherical aberration of the light beam occurring when no disk is present in FIG. 7.

In this case, the light beam is not condensed on the signal recorded surface 1a of the CD 1 and the spherical aberration of the inverse direction to FIG. 8 occurs in the rear side of the signal recorded surface 1a, thus making it impossible to read the signal recorded surface 1a of the CD 1.

Figure 10:
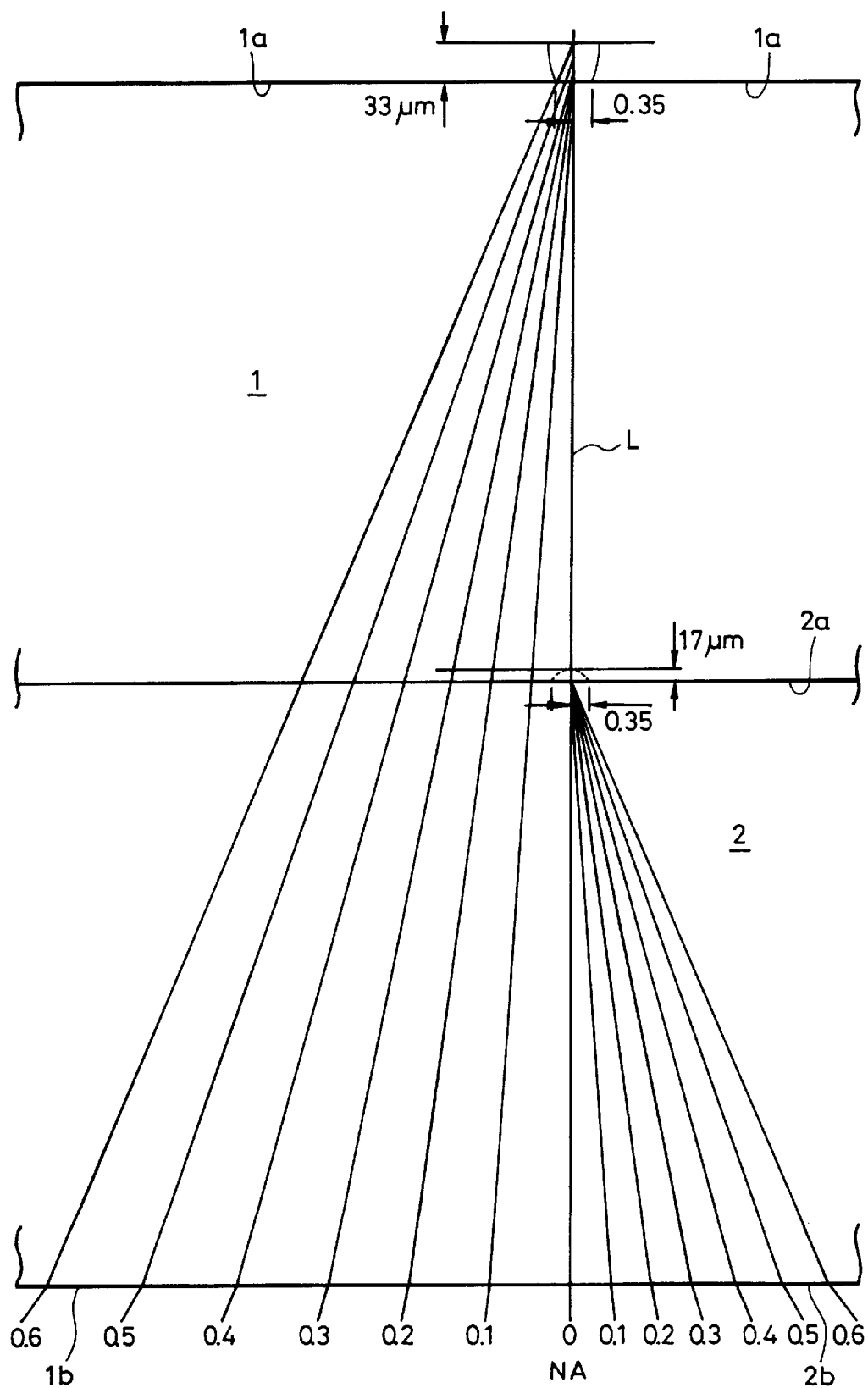
FIG. 10 is a condensed light diagram showing traces of the light beam for obtaining the objective lens according to the present invention.
Figure 11:
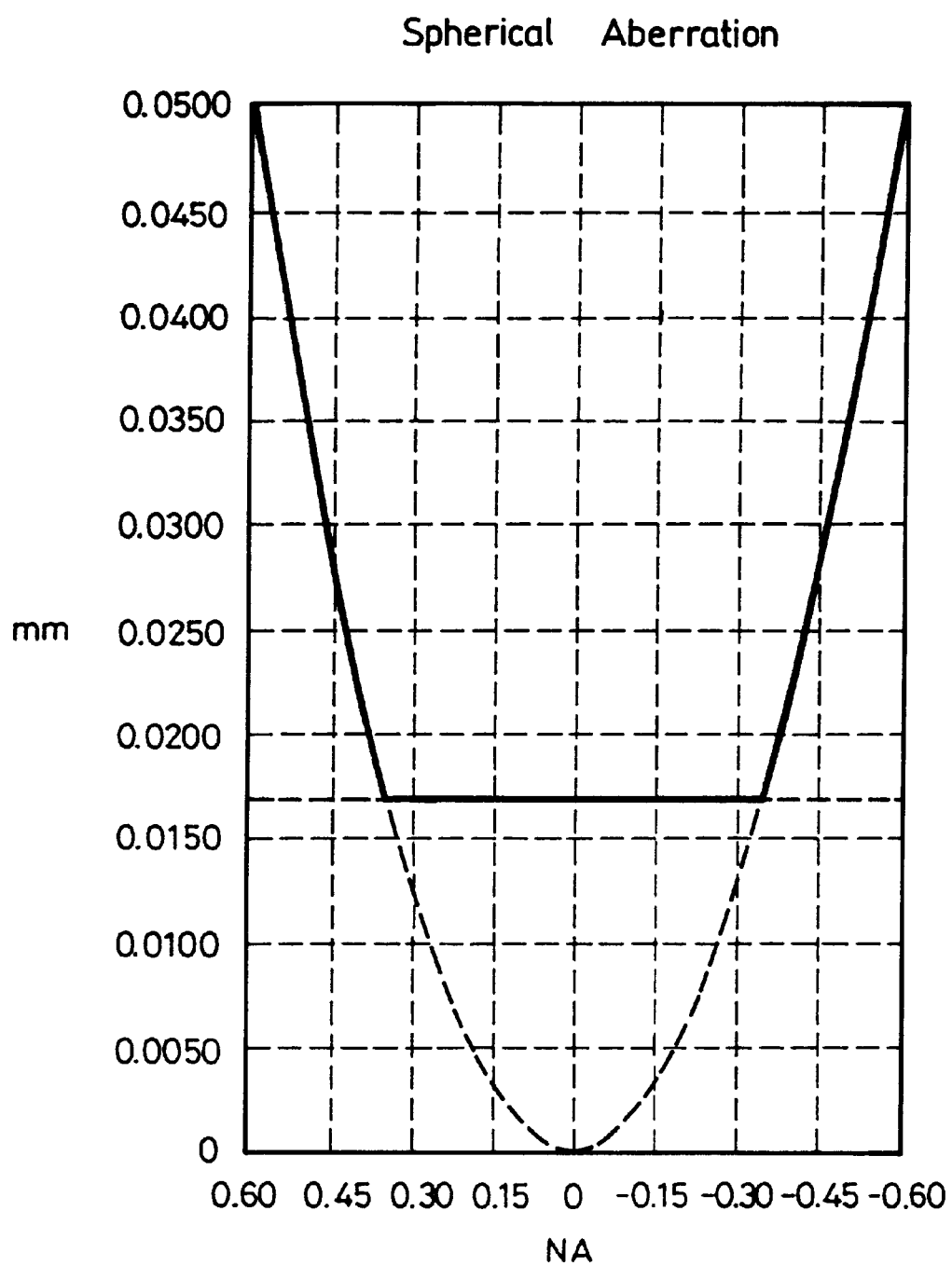
FIG. 11 is a diagram showing the spherical aberration for obtaining an condition of FIG. 10.

Thus, the present inventor addressed attention to the point that it would be possible to focus the light beam on the respective signal recorded surfaces 2a and 1a of the DVD 2 and the CD 1 through a single objective lens for reading, if the objective lens is designed so as to cause the spherical aberration as shown in FIG. 11 at both the light condensed position of the DVD 2 and the light condensed position of the CD 1 shown in FIG. 10 showing the traces of the light beam.

Specifically, in case of the DVD 2, the readout of the signal recorded surface 2a is performed by using the light beam condensed through the whole lens surface of the objective lens, and at this time it is arranged so that the spherical aberration may occur within the range of about 17 μm in the rear side from the focused point when the NA is on the center side from 0.35. Also, in case of the CD 1, the readout of the signal recorded surface 1a is performed by using the light beam condensed through the central portion of the objective lens where the NA is in the range of 0 to 0.35, and at this time it is arranged so that the spherical aberration may occur within the range of about 33 μm in the rear side from the focused point when the NA is in the range of 0.35 to 0.6.

Figure 12:
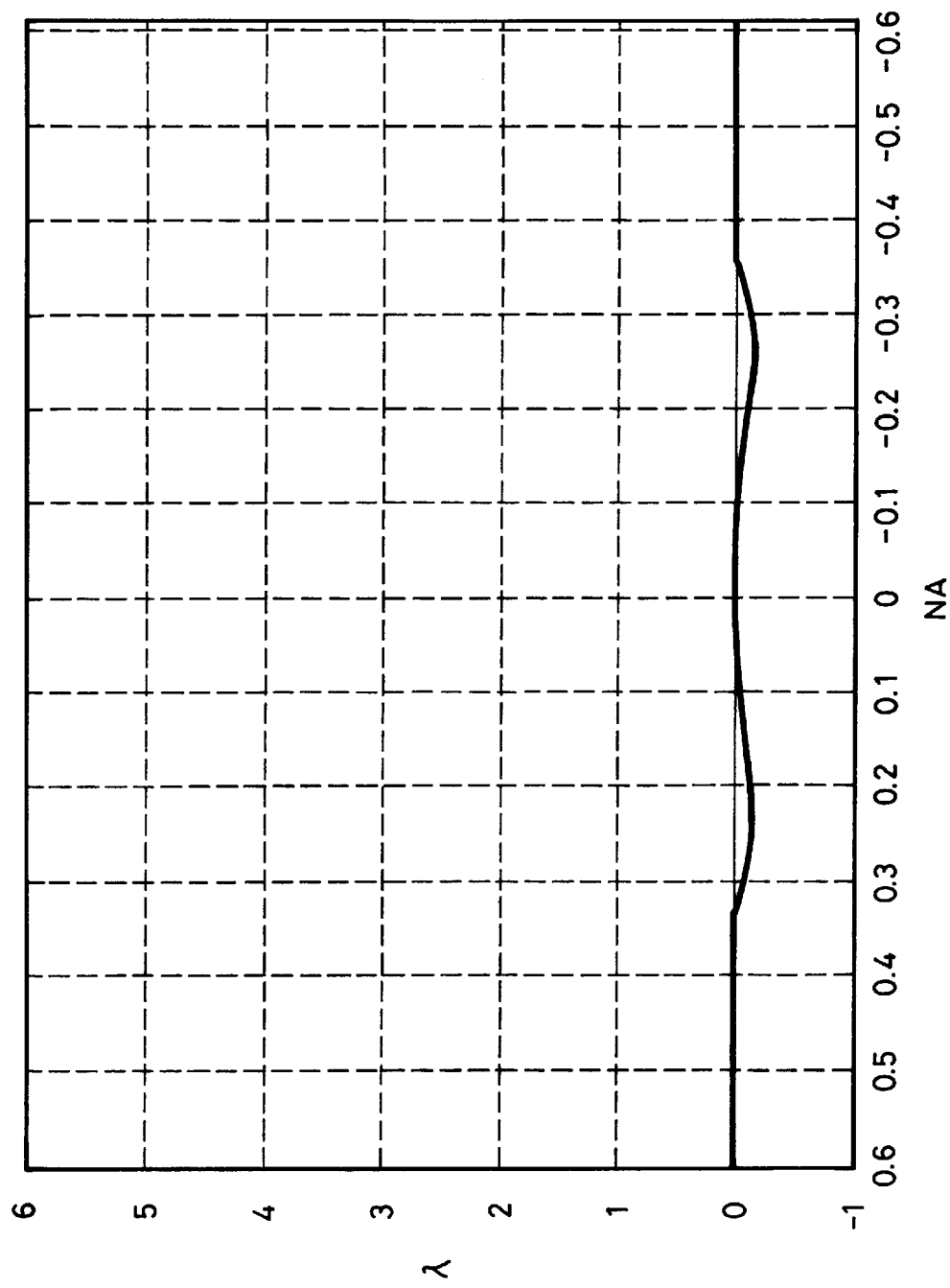
FIG. 12 is a diagram showing the wave front aberration occurring on the central side of the control optical axis when reading DVD through the objective lens for the DVD.

The wavefront aberration which is thus caused when the light beam is in focus on the signal recorded surface 2a of the DVD 2 is shown in FIG. 12. From this it is understandable that in the readout of the DVD 2 the light beam in the range of NA 0.35 to 0.6 is surely in focus. Moreover, the wavefront aberration which occurs in the range of about NA 0.35 from the center having no relation to the readout of the DVD 2 is a small value of about ⅙λ and so it will cause no affect on reading the DVD 2.

Figure 13:
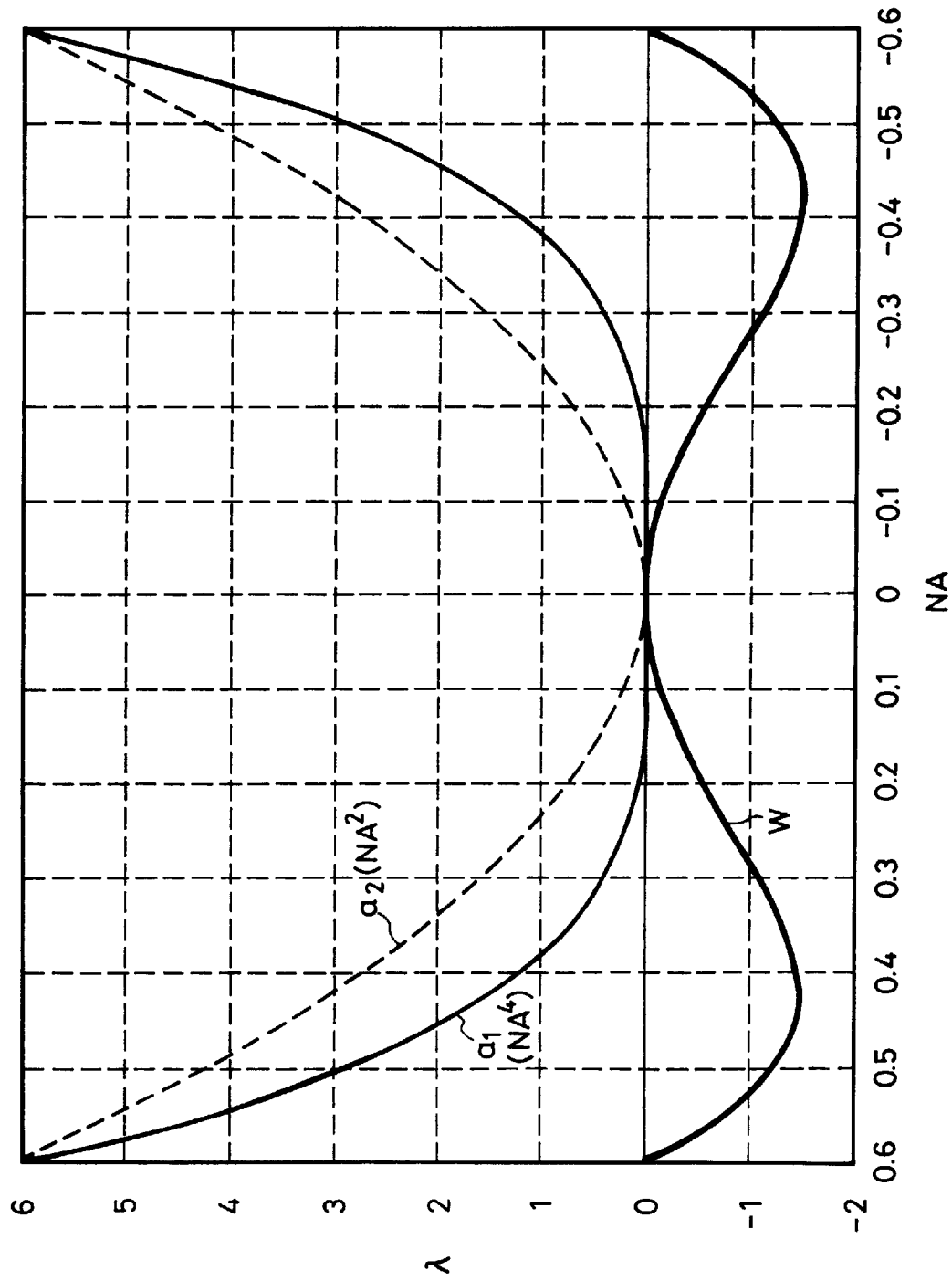
FIG. 13 is a diagram showing the aberration when the light transmitting layer is shifted by 0.6 mm through the objective lens for the DVD.

On the other hand, a wavefront aberration W when the light beam is focused on the signal recorded surface 1a of the CD 1, in other words, when the thickness of the light transmitting layer is shifted by 0.6 mm is shown in FIG. 13. Here, $a_1$ is a spherical aberration ($NA^4$) proportional to the fourth power of the NA and $a_2$ is a spherical aberration ($NA^2$) when defocused. A wavefront by subtracting the aberration $a_2$ of a defocused amount from the wavefront $a_1$ is the wavefront aberration W described above. However, at this position, it is impossible to read the signal recorded surface 1a of the CD 1 because a large wavefront aberration W occurs.

It is found that the optimum focused position to read the CD 1 exists at this side (at a position of about 17 μm)from the position where the wavefront aberration w occurs. In other words, by subtracting the defocus amount of ⅓ λ from the spherical aberration $a_1$ ($NA^4$), it is found that there exists a wavefront viewed from the Gaussian imaging plane as is shown in FIG. 14.

This wavefront has very small wavefront in the range of NA 0 to 0.35, so that it is possible to read the signal recorded surface 1a of the CD 1. By making the wavefront to be flat in order to further optimize as shown in FIG. 15, it is possible to perform the ideal readout.

Figure 14:
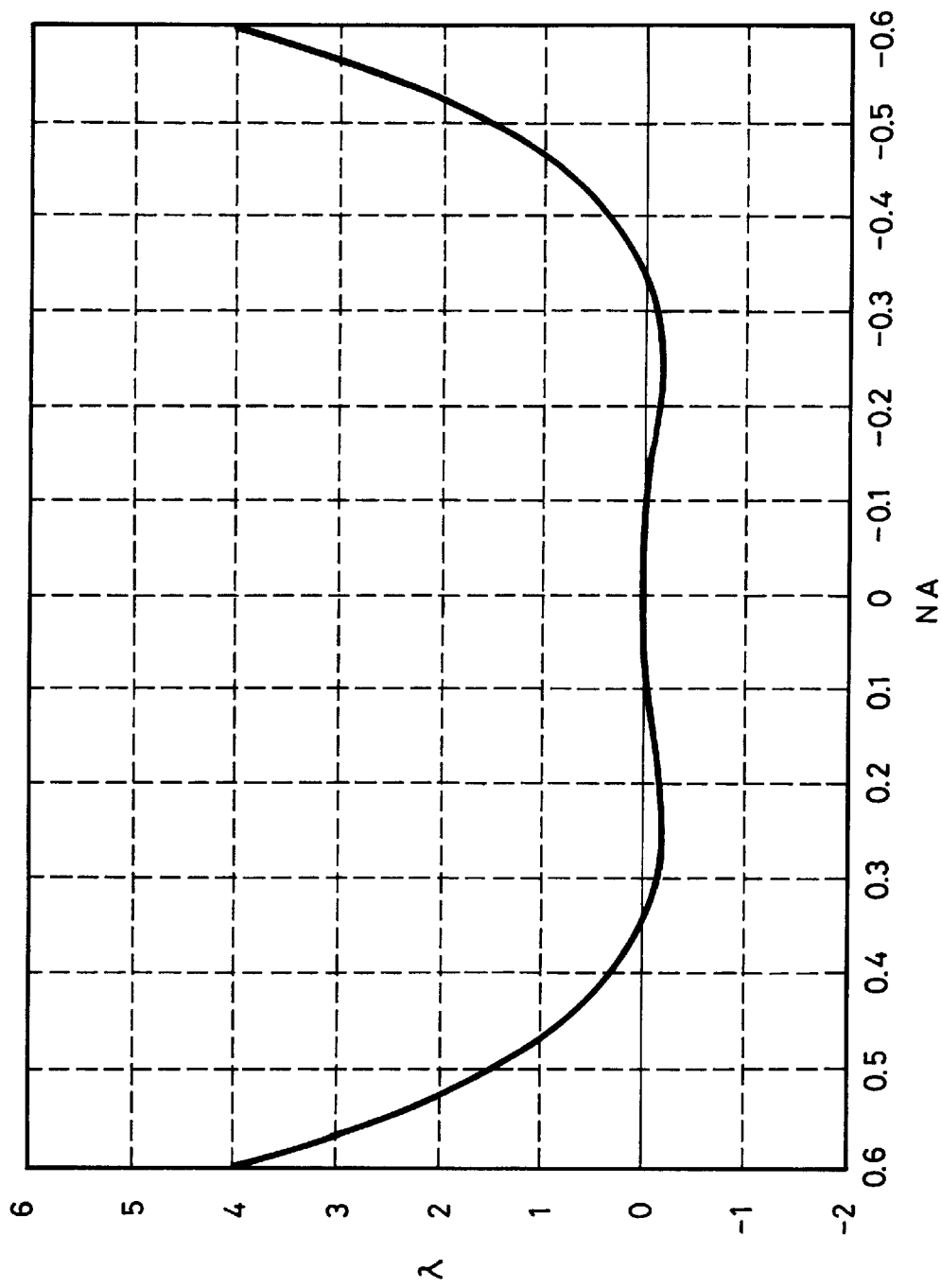
FIG. 14 is a diagram showing the aberration in an almost optimized position under the condition of FIG. 13.
Figure 15:
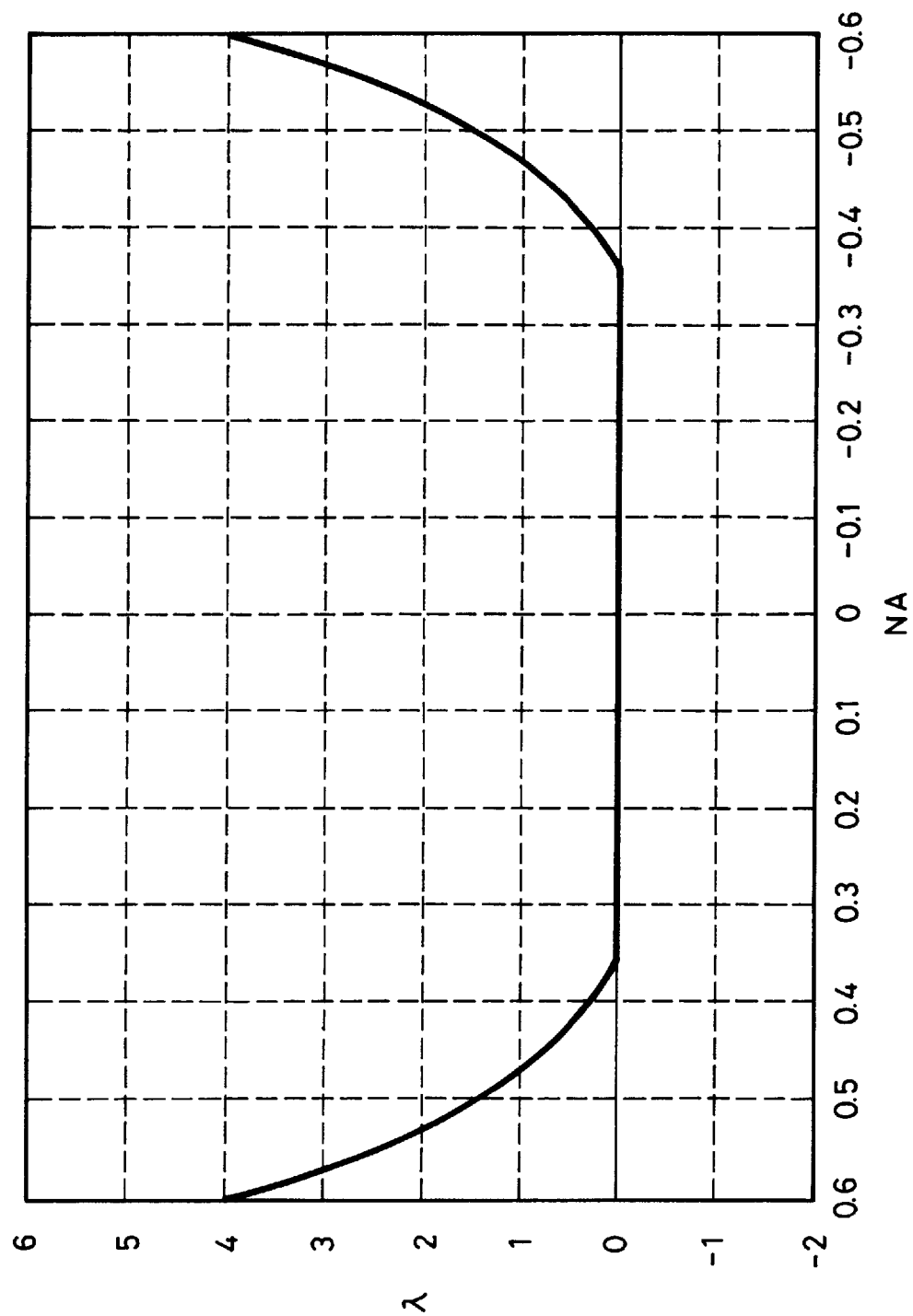
FIG. 15 is a diagram showing the ideal state of zero aberration for reading the CD through the objective lens for the DVD.

Specifically, in order to make flat in the range of about NA=0 to 0.35 as shown in FIG. 15, the lens surface of the objective lens can be worked so that the wavefront shown in FIG. 14 may be corrected.

Figure 16:
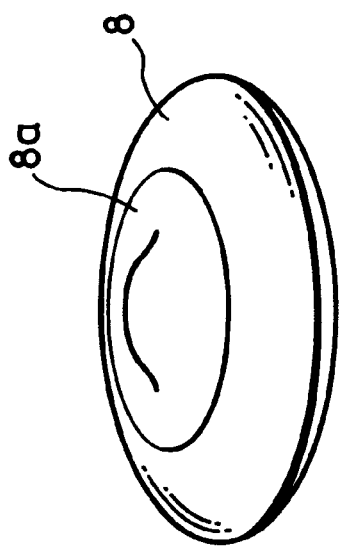
FIG. 16 is an appearance perspective view of the objective lens according to the present invention.

Assuming here that a refraction index n of the lens is equal to 1.5, the phase will be shifted by n−1/n. In other words, the wavefront is shifted by 0.5/1.5=1/3·Δt. Therefore, it will be sufficient to work the lens surface of the objective lens into a correcting lens surface 8a whose wavefront is made deeper three times λ/2 relatively to the wavefront shown in FIG. 14. A shape of the lens surface of the objective lens 8 worked in this manner is shown in FIG. 16.

Figure 17:
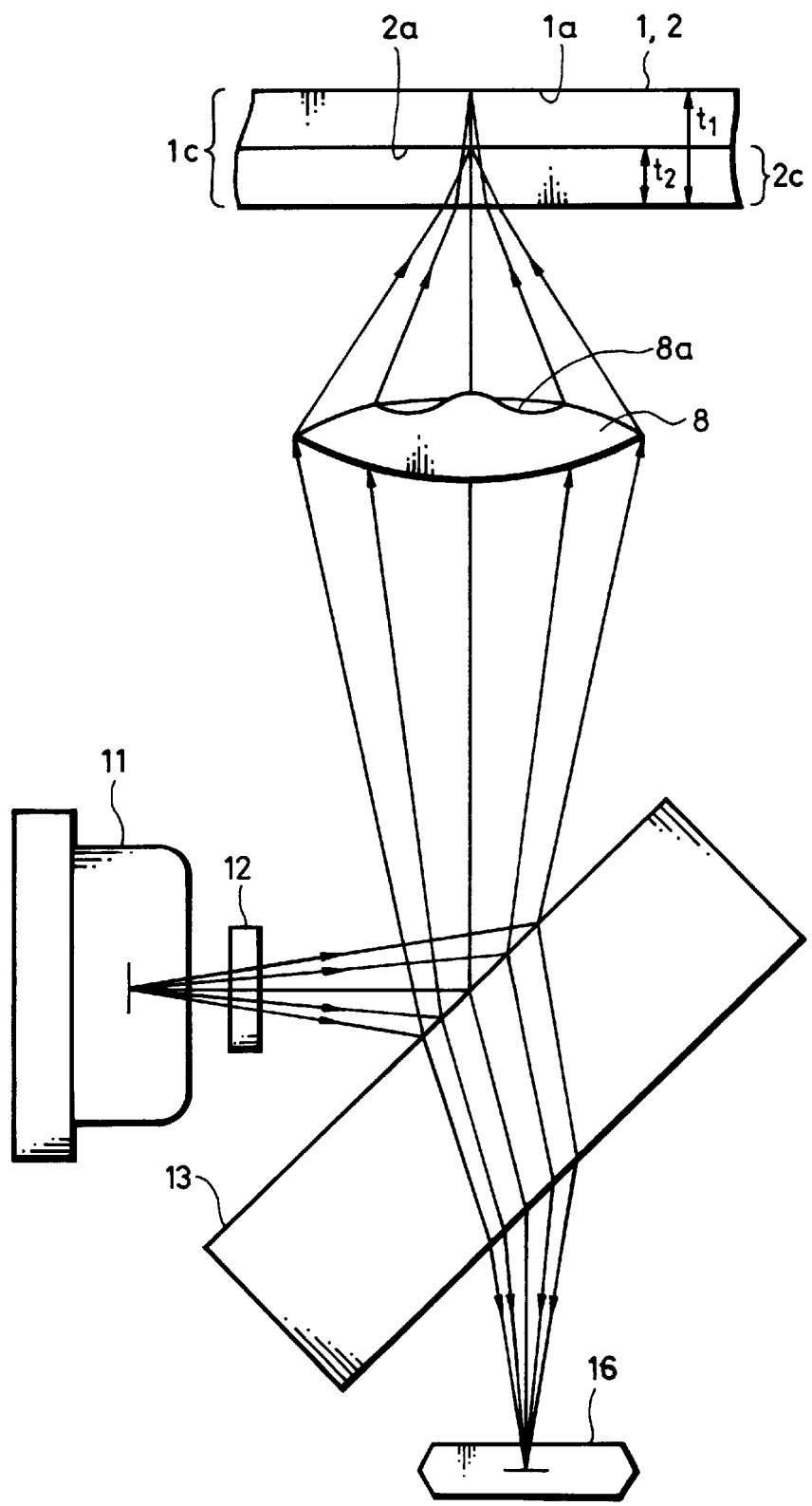
FIG. 17 is a diagram showing the operation of reading the DVD and the CD using the objective lens according to the present invention.

In this way, according to the present invention, it is possible to read the signal recorded surface 2a of the DVD 2 as well as the signal recorded surface 1a of the CD 1 using the objective lens 8 having the correcting lens surface 8a for the DVD, as is shown in FIG. 17.

In addition, when reading the signal recorded surface 1a of the CD 1 using the objective lens for the DVD, since the light transmitting layer of the CD 1 is thicker than that of the DVD 2 by 0.6 mm, it is necessary to bring the objective lens close to the CD 1 due to the effect of the refraction index of the lens. That is to say, assuming the refraction index n of the lens is 1.5, bringing close by 0.6/1.5=0.4 mm allows the CD 1 to be read. Accordingly, the optical head unit having the objective lens comprises a driving mechanism not shown which is movable in the direction of the optical axis by 0.4 mm.

Having described the referred embodiment of the present invention in which the correcting lens surface 8a of the objective lens 8 is formed on the lens surface facing the recording medium, it is also possible to obtain the same effect as described above by forming the correcting lens surface on the opposite side of the lens surface to the recording medium or on both lens surfaces.

Moreover, having described the embodiment in which the objective lens can read both of the signal recorded surfaces of the DVD and the CD, the present invention is widely also applicable to other objective lenses which read a plurality of recording media having the light transmitting layers of different thicknesses.

Furthermore, the present invention can be applied as the objective lens when reproducing from a recording medium other than the disk.

As described above, the objective lens according to the present invention is made of a single lens member and is arranged to have the correcting lens surface for correcting the aberration caused when reading the recording media having the light transmitting layers of different thicknesses, so that it is possible to focus the light beam on the signal recorded surfaces of the recording media having the light transmitting layers of different thicknesses through a single objective lens for ensuring the readout and since there is not a need to add any new component to the peripheral portion of the objective lens, it is easy to control the aberration of the optical system.

Moreover, the reproducing apparatus according to the present invention comprises the light source for emitting a common light beam, the optical splitter means for splitting the light beam by reflection and penetration, the objective lens which is a common lens for focusing the common light beam reflected by the optical splitter means on the respective signal recorded surfaces of at least two recording media having the light transmitting layers of different thicknesses and which has a correcting lens surface for correcting the aberration caused when reading the recording media having the light transmitting layers of different thicknesses by the lens, and the photo detector means for receiving the light which is reflected from the respective signal recorded surfaces of at least two recording media and penetrates the optical splitter means, wherein the reproductive processing unit is arranged to process for reproducing the electric signal in dependence on the reflected light detected by the photo detector means from the respective signal recorded surfaces of the recording media, so that it is possible to focus the light beam on the signal recorded surfaces of the recording media having the light transmitting layers of different thicknesses through a single objective lens thereby ensuring the readout, which makes it in turn to be a highly reliable reproducing apparatus. Also, it is possible to realize miniaturizing the apparatus and lowering its costs.

Furthermore, the reproducing method according to the present invention uses the objective lens having the correcting lens surface for correcting the aberration caused when reading the recording media having the light transmitting layers of different thicknesses, as the lens for making the light beam to be focused on the respective signal recorded surfaces of the recording media, for the recording medium having the light transmitting layer of small thickness, the signal recorded surface being read by the light beam condensed through the whole surface of the objective lens, while for the recording medium having the light transmitting layer of large thickness, the signal recorded surface thereof being read by the light beam condensed through the correcting lens surface, so that it is possible for the light beams having different focal distances to be focused on the respective signal recorded surfaces of at least two recording media having the light transmitting layers of different thicknesses, thereby allowing the signal recorded surfaces of the recording media having the light transmitting layers of different thickness to be surely readout.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. An objective lens arranged so that a light beam emitted from a common light source focused through an objective lens on either a first or a second signal recording surface of light transmitting layers in a recording media having the layers of different thicknesses, comprising:

a single lens member forming said objective lens focusing the light beam onto the first signal recording surface; and a correcting lens surface on the single lens member correcting an aberration caused when the single lens member focuses the light beam on the second signal recording surface;

wherein the first signal recording surface is read with a light beam condensed through the whole surface of the objective lens; and wherein the correcting lens surface forms a wavefront aberration that is flat when the second signal recording surface is read with said light beam.

2. An objective lens according to claim 1, wherein the respective thickness of said light transmitting layers are 1.2 mm and 0.6 mm, the aberration occurring when reading the second signal recording surface of the recording medium having the light transmitting layer of 1.2 mm in thickness through an objective lens and for reading the signal recording surface of the recording medium having the light transmitting layer of 1.2 mm in thickness through an objective lens for reading the first signal recording surface of the recording medium having the light transmitting layer of 0.6 mm in thickness is corrected by the correcting lens surface.

3. An objective lens according to claim 1, wherein when said objective lens has a numerical aperture NA of 0.6, a numerical aperture NA of said correcting lens surface is in a range from zero to 0.3–0.4.

4. An objective lens according to claim 1, wherein when said objective lens has a numerical aperture NA of 0.6, a numerical aperture NA of said correcting lens surface is in a range from zero to 0.3–0.4.

5. A reproducing apparatus according to claim 4, wherein said at least two recording media are recording media having said light transmission layers whose thicknesses are 1.2 mm and 0.6 mm, respectively.

6. A reproducing apparatus according to claim 5, wherein said at least two recording media are recording media having said light transmission layers whose thicknesses are 1.2 mm and 0.6 mm, respectively.

7. A reproducing method of focusing a light beam to irradiate first and second respective signal recording surfaces of at least two recording media having light transmitting layers of different thicknesses from light incident to the signal recorded surface through a single common lens, converting its reflected light to an electric signal, and reproducing information signal recorded on signal recorded surfaces in accordance with said electric signal, comprising the steps of:

employing as a lens for irradiating a light beam on said respective first and second signal recording surfaces of light transmitting layers in said recording media, an objective lens focusing the light beam of said objective lens onto the first signal recording surface; and a correcting lens surface on the single lens member correcting an aberration caused when the single lens member focused the light beam on the second signal recording surface; and reading a second signal recorded surface of the recording medium having a light transmitting layer of smaller thickness with a light beam condensed through the whole surface of said objective lens; and reading a signal recorded surface of a recording medium having a light transmitting layer of larger thickness with the light beam condensed the correcting lens surface.

8. A reproducing method according to claim 7, wherein said recording having light transmitting layer of different thickness media are recording media having said light transmission layers whose thicknesses are 1.2 mm and 0.6 mm, respectively, and when reading a recording medium having the light transmitting layer of larger thickness, said objective lens is made closer to read by an amount of a different reflective index of the light transmitting layer.

9. An objective lens according to claim 7, wherein when said objective lens has a numerical aperture NA of 0.6, a numerical aperture NA of said correcting lens surface is in a range from zero to 0.3–0.4.

10. An objective lens for focusing a light beam emitted from a common light source to a first or a second signal recording surface of light transmitting layers in a recording medium having said layers of a different thickness, comprising:

a lens surface of said objective lens providing an spherical aberration wavefront in the range of NA of 0 to about 3.50, said lens surface including a correcting lens surface making said said aberration wavefront flat for said range.

* * * * *